(12) United States Patent
Hashimoto

(10) Patent No.: US 6,667,859 B1
(45) Date of Patent: Dec. 23, 2003

(54) ROTATIONAL BALANCE ADJUSTMENT MECHANISM FOR A ROTARY HEAD DRUM DEVICE

(75) Inventor: Katsuhiro Hashimoto, Hiratsuka (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 21 days.

(21) Appl. No.: 09/609,351

(22) Filed: Jul. 5, 2000

(30) Foreign Application Priority Data

Jul. 6, 1999 (JP) .......................... 11-192315

(51) Int. Cl.[7] ................................. G11B 5/52
(52) U.S. Cl. .................................. 360/271.1
(58) Field of Search ..................... 360/271.1, 271.6, 360/281.1, 291.1, 291.7, 291.8, 84, 87, 281; 420/557, 561, 562; 228/180.22

(56) References Cited

U.S. PATENT DOCUMENTS

| | | | |
|---|---|---|---|
| 4,031,558 A | * 6/1977 | Kusaka | 360/130.24 |
| 4,823,218 A | * 4/1989 | Ibe et al. | 360/104 |
| 4,972,283 A | * 11/1990 | Kim | 360/271.3 |
| 5,051,852 A | * 9/1991 | Kohno et al. | 360/84 |
| 5,682,283 A | * 10/1997 | Uyama et al. | 360/107 |
| 5,684,656 A | * 11/1997 | Jung | 360/281.8 |
| 5,762,866 A | * 6/1998 | Jin et al. | 420/557 |
| 5,907,458 A | * 5/1999 | Choi | 360/107 |
| 5,984,165 A | * 11/1999 | Inoue et al. | 228/180.22 |
| 6,014,286 A | * 1/2000 | Tsutaki et al. | 360/84 |
| 6,160,224 A | * 12/2000 | Ogashiwa et al. | 174/257 |
| 6,274,474 B1 | * 8/2001 | Caletka et al. | 438/613 |

FOREIGN PATENT DOCUMENTS

| | | | |
|---|---|---|---|
| JP | 03-252914 | * 11/1991 | |
| JP | 09-091636 | * 4/1997 | |
| JP | 09265615 A | * 10/1997 | G11B/5/52 |

\* cited by examiner

Primary Examiner—David L. Ometz
(74) Attorney, Agent, or Firm—Ladas & Parry

(57) ABSTRACT

A rotational balance adjustment mechanism for a rotary head drum device includes a fixed drum, a shaft rotatably driven by a motor provided on the fixed drum, a rotary drum mounting a magnetic head, the rotary drum rotating atop the fixed drum, and a rotary transducer having a fixed transducer member provided on the fixed drum and a rotating transducer member provided on the rotary drum, the rotating transducer member adapted to mount a balance weight for adjusting the rotational balance of the rotary drum.

6 Claims, 2 Drawing Sheets

ROTATIONAL BALANCE ADJUSTMENT MECHANISM FOR A ROTARY HEAD DRUM DEVICE

BACKGROUND OF THE INVENTION

1. Field of the Invention

The present invention relates generally to a rotational balance adjustment mechanism for a rotary head drum device.

2. Description of the Related Art

Typically, apparatuses such as a videotape recorder (VTR) or a digital audio tape recorder (DAT), for example, are equipped with a rotary head drum device consisting of a fixed drum and a rotary drum. In addition, the magnetic tape must be wound helically around the rotary head drum, so the rotary drum is mounted on the main chassis at an angle thereto as a result.

Conventionally, a balance weight is mounted as one method for adjusting the rotational balance of the rotary drum of a rotary head drum device such as that described above.

However, although conventional rotary drum rotation speeds have been on the order of approximately 2000 RPM, the need for ever-faster tape data transfer rates (typically measured in MB/s) now necessitates rotational speeds on the order of 10,000 rpm or more.

Given such increased rotational speeds, the conventional rotational balance adjustment method has not always proved satisfactory. In particular, the rotary transducer provided at a position removed from the fixed portions of the rotary drum and shaft has been susceptible to imbalances. Such imbalances in the rotary transducer can cause fluctuations in the height of the magnetic head provided in the vicinity of the transducer, such that the magnetic head deviates from its assigned position and aversely affects reproduction and recording characteristics. Additionally, the joints of the head may come apart due to excessive vibration.

SUMMARY OF THE INVENTION

Accordingly, it is a general object of the present invention to provide an improved and useful rotational balance adjustment mechanism for a rotary head drum device in which the disadvantages described above are eliminated.

Another, further and more specific object of the present invention is to provide an improved and useful rotational balance adjustment mechanism for a rotary head drum device in which vibration generated when the rotary drum rotates at high speed can be effectively reduced, and in particular, in which fluctuations in the height of the magnetic head can be effectively restrained.

The above-described objects of the present invention are achieved by a rotational balance adjustment mechanism for a rotary head drum device having a fixed drum, a shaft rotatably driven by a motor provided on the fixed drum, a rotary drum mounting a magnetic head, the rotary drum rotating atop the fixed drum, and a rotary transducer having a fixed transducer member provided on the fixed drum and a rotating transducer member provided on the rotary drum, the rotating transducer member adapted to mount a balance weight for adjusting the rotational balance of the rotary drum.

Additionally, the above-described objects of the present invention are also achieved by a rotational balance adjustment mechanism for a rotary head drum device including a fixed drum, a shaft rotatably driven by a motor provided on the fixed drum, a rotary drum mounting a magnetic head, the rotary drum rotating atop the fixed drum, a rotary transducer having a fixed transducer member provided on the fixed drum and a rotating transducer member provided on the rotary drum, and a mounting member mounted on the rotating transducer member, the mounting member adapted to mount a balance weight for adjusting the rotational balance of the rotary drum.

In the invention described above the mounting member may be a printed circuit board or the like provided with electrodes for electrically connecting the magnetic head and the rotating transducer member, the printed circuit board being mounted on the rotating transducer member.

According to the invention described above, balance weight for rotational balance adjustment can be mounted as appropriate, thus effectively reducing the vibrations generated when the rotary drum rotates at high speeds, and in particular reducing fluctuations in the height of the magnetic head. As a result, the adverse effects on the recording and reproduction characteristics of the magnetic head deviating from its assigned position and the coming apart of the head at the joints caused by excessive rotational vibration are also reduced.

Additionally, the above-described objects of the present invention are also achieved by the rotational balance adjustment mechanism for a rotary head drum device as described above, wherein the balance weight is mounted at an arbitrary position at a predetermined distance along an outer periphery of the rotating transducer member.

Additionally, the above-described objects of the present invention are also achieved by the rotational balance adjustment mechanism for a rotary head drum device as described above, wherein the balance weight is mounted at an arbitrary position at a predetermined distance along an outer periphery of the mounting member.

According to the invention described above, one or more balance weights of the desired amount can be easily mounted at any desired position along the outer periphery of the rotating transducer member or mounting member, making fine adjustment of the rotational balance possible.

Additionally, the above-described objects of the present invention are also achieved by the rotational balance adjustment mechanism for a rotary head drum device wherein the balance weight can may be made of solder or resin.

According to the invention described above, the use of solder as the balance weight means that the balance weight does not easily come unseated from and fly off the rotating transducer member or the mounting member, as the case may be. Additionally, the use of resin as the balance weight means that a cheap, relatively easily mountable material can be used to carry out rotational balance adjustment.

Additionally, the above-described objects of the present invention are also achieved by the rotational balance adjustment mechanism for a rotary head drum device as described above, wherein the balance weight or mounting member can be variably shaped.

According to the invention described above, fine adjustment of the rotational balance can be achieved with ease, simply by shaving or bending the balance weight to achieve the desired balance. Similarly, the mounting member may also be simply bent to achieve the desired balance.

Additionally, the above-described objects of the present invention are also achieved by the rotational balance adjustment mechanism for a rotary head drum device as described above, further having a guard member to prevent the balance weight from becoming unseated and flying off the rotational balance adjustment mechanism.

According to the invention described above, the possibility that the balance weight may become unseated from and fly off the rotational balance adjustment mechanism at high rotational speeds may be further prevented.

Other objects, features and advantages of the present invention will become more apparent from the following detailed description when read in conjunction with the accompanying drawings.

DESCRIPTION OF THE PREFERRED EMBODIMENTS

A description will now be given of a rotational balance adjustment mechanism for a rotary head drum device according to an embodiment of the present invention, with reference to the accompanying drawings. It should be noted that identical or corresponding elements are given identical or corresponding reference numbers in all drawings, with detailed descriptions thereof given once and thereafter omitted.

Figure 1:
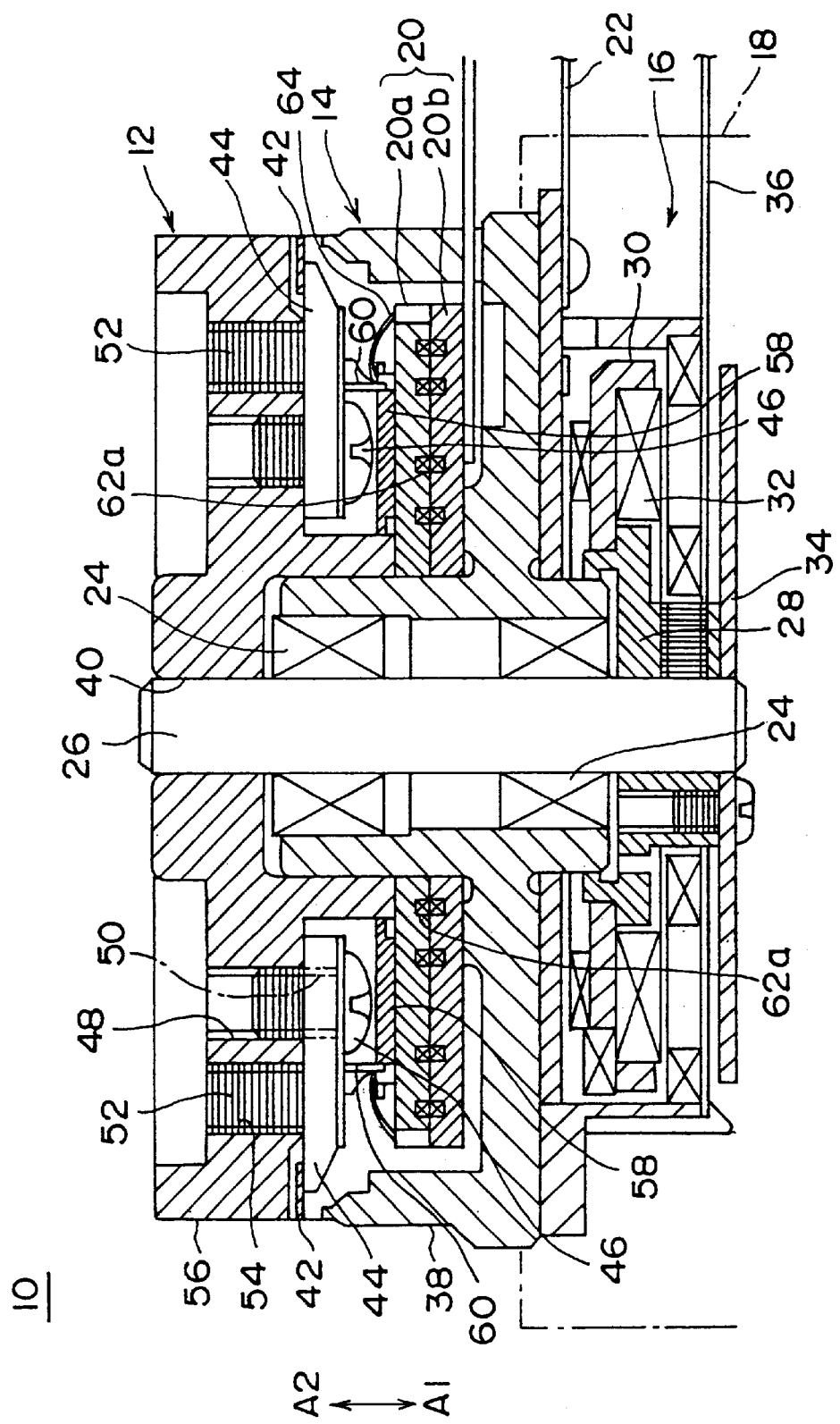
FIG. 1 is schematic cross-sectional view with a portion of the rotary head drum device not shown, for the purpose of explaining a rotational balance adjustment mechanism for a rotary head drum device according to an embodiment of the present invention.

FIG. 1 is schematic cross-sectional view with a portion of the rotary head drum device not shown, for the purpose of explaining a rotational balance adjustment mechanism for a rotary head drum device according to an embodiment of the present invention. As shown in the diagram, a rotary head drum device 10 mounts a rotary drum 12, a fixed drum 14 and a drum motor 16. The fixed drum 14 is mounted on a drum base 18, the drum base 18 being mounted in a slanted state on a magnetic recording/reproduction apparatus chassis which, for simplicity, is not shown in the diagram.

Additionally, a fixed-side rotary transducer (hereinafter referred to as a fixed rotary transducer) 20b is provided. The fixed rotary transducer 20b forms one part of a rotary transducer 20 and is connected to a signal flexible substrate 22 that is itself provided on the fixed drum 14. The fixed drum 14 is centrally supported by a shaft 26 via ball bearings 24.

The drum motor 16 is provided on a bottom part of the fixed drum 14. The shaft 26 is attached to a shaft mount (that is, a rotating collar) 28, with a magnet 32 mounted on a first yoke 30 extending from the shaft mount 28. A rotor plate (a second yoke) 34 extends from a bottom edge of the shaft mount 28 so as to be disposed opposite the yoke 30. A stator substrate (motor substrate) 36 is provided in the space formed between the first yoke 30 mounting the magnet 32 and the second yoke 34 disposed opposite thereto. The stator substrate 36 is retained by the drum base 18. A drive coil not shown in the drawing is formed on the stator substrate 36. When the drive coil is supplied with an electrical drive current the drum motor 16 generates a rotational force.

It should be noted that a tape contact surface 38 is formed over a predetermined range over which the magnetic tape (not shown in the drawing) contacts the fixed drum 14. As will be appreciated, the tape contact surface 38 is the surface over which the magnetic tape travels during magnetic recording and reproduction, and thus is formed to a highly smooth finish with a high degree of precision.

The rotary drum 12 is fixedly mounted on a top edge of the shaft 26. In other words, the shaft 26 is pressed into a shaft hole 40 formed in the rotary drum 12. As a result, the rotary drum 12 is rotatably supported via the shaft 26 so as to be freely rotatable with respect to the fixed drum 14.

The rotary drum 12 mounts a plurality of magnetic heads 42, in this case four magnetic heads 42 spaced 90 degrees apart. As can be appreciated, the magnetic heads 42 rotate with the rotation of the rotary drum 12. In the case of four magnetic heads 42, those magnetic heads 42 spaced 180 degrees apart form pairs. One of the two pairs of magnetic heads 42 thus formed functions solely as recording heads while the remaining pair functions solely as reproduction heads.

The magnetic heads 42 are mounted not directly on the rotary drum 12 but via the head base 44. The head base 44 may for example comprise a resin substrate, with the magnetic heads 42 being fixedly mounted on an edge of the substrate using an adhesive.

The head base 44 is fixedly mounted to the rotating drum 12 by fixing screws 46. In other words, screw holes 48 are formed in the rotary drum 12 to accommodate the head fixing screws 46. Additionally, through holes 50 are formed in the head base 44. The head base 44 is fixedly mounted on the rotary drum 12 by positioning the head base 44 against a bottom surface of the rotary drum 12 so that the through-holes 50 and the screw holes 48 are concentrically aligned, passing the head fixing screws 46 through the through holes 50 and screwing the head fixing screws 46 into the screw holes 48.

Additionally, the rotary drum 12 is also provided with adjusting screws 52 for adjusting the height of the individual magnetic heads 42. The adjusting screws 52 are threaded into adjustment holes 54 formed in the rotary drum 12, the depth to which the adjusting screws 52 are threaded determining the height to which the magnetic heads 42 are adjusted.

More specifically, the adjusting screws 52 are constructed so as to contact the head base 44 at a point between the head fixing base 46 and the point at which the magnetic heads 42 are positioned. By advancing the adjusting screws 52 the head base 44 elastically deforms in the direction of arrow A1 in FIG. 1. By retreating the adjusting screws 52 the head base 44 elastically resumes its original form in the direction of arrow A2 in FIG. 1, as a result of which the height of the magnetic head 42 can be adjusted. It should be noted that the adjusting screws 52 are fixed in place with an adhesive after adjustment of the height of the magnetic heads 42 has been completed.

It should be noted that a tape contact surface 56 is formed over a predetermined range over which the magnetic tape (not shown in the drawing) contacts the rotary drum 12. As will be appreciated, the tape contact surface 56 is the surface over which the magnetic tape travels during magnetic recording and reproduction, and thus is formed to a highly smooth finish with a high degree of precision.

Additionally, a rotating-side rotary transducer (hereinafter referred to as a rotating rotary transducer) 20a is provided at a bottom surface of the rotary drum 12. Each of the magnetic heads 42 is connected to the rotating rotary transducer 20a. A terminal 58 that acts as a mounting member is provided on top of the rotating rotary transducer 20a. Electrodes 60 to which the magnetic heads 42 are electrically connected are provided on the terminal 58. Additionally, one end 64 of a coil 62a wound around the rotating rotary transducer 20a is electrically connected to the electrodes 60.

Disposed opposite the rotating rotary transducer 20a of the rotary drum 12 is the fixed rotary transducer 20b described above that forms a part of the rotary transducer 20 together with the rotating rotary transducer 20a. Signals can be transmitted and received between the rotating rotary transducer 20a and the fixed rotary transducer 20b. Therefore, during recording the recording signals for recording information onto the magnetic tape are supplied to the magnetic heads 42 from the signal flexible substrate 22 via the rotary transducer 20, while during reproduction the reproduction signals read from the magnetic tape by the magnetic heads 42 are supplied to the flexible substrate 22 via the rotary transducer 20.

A description will now be given of the rotational balance adjustment mechanism itself, with reference to the accompanying drawings. As will be described, the rotational balance adjustment mechanism according to an embodiment of the present invention is provided on the terminal 58, which is itself provided atop the rotating rotary transducer 20a as a mounting member.

Figure 2:
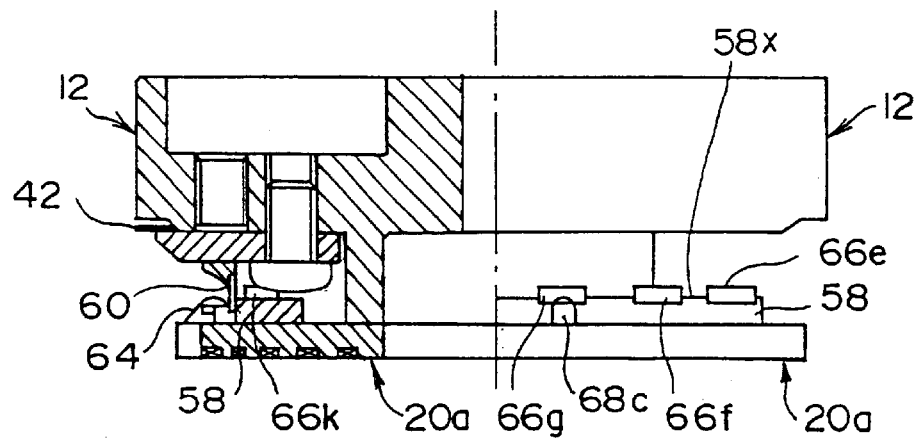
FIG. 2 is a diagram for the purpose of explaining a rotational balance adjustment mechanism for a rotary head drum device according to an embodiment of the present invention, showing a partially abbreviated cross-sectional view of the rotary drum and the rotating rotary transducer to the left of the centerline and a partially abbreviated side view of the rotary drum and the rotating rotary transducer to the right of the centerline.

FIG. 2 is a diagram for the purpose of explaining a rotational balance adjustment mechanism for a rotary head drum device according to an embodiment of the present invention, showing a partially abbreviated cross-sectional view of the rotary drum and the rotating rotary transducer to the left of the centerline and a partially abbreviated side view of the rotary drum and the rotating rotary transducer to the right of the centerline.

Figure 3:
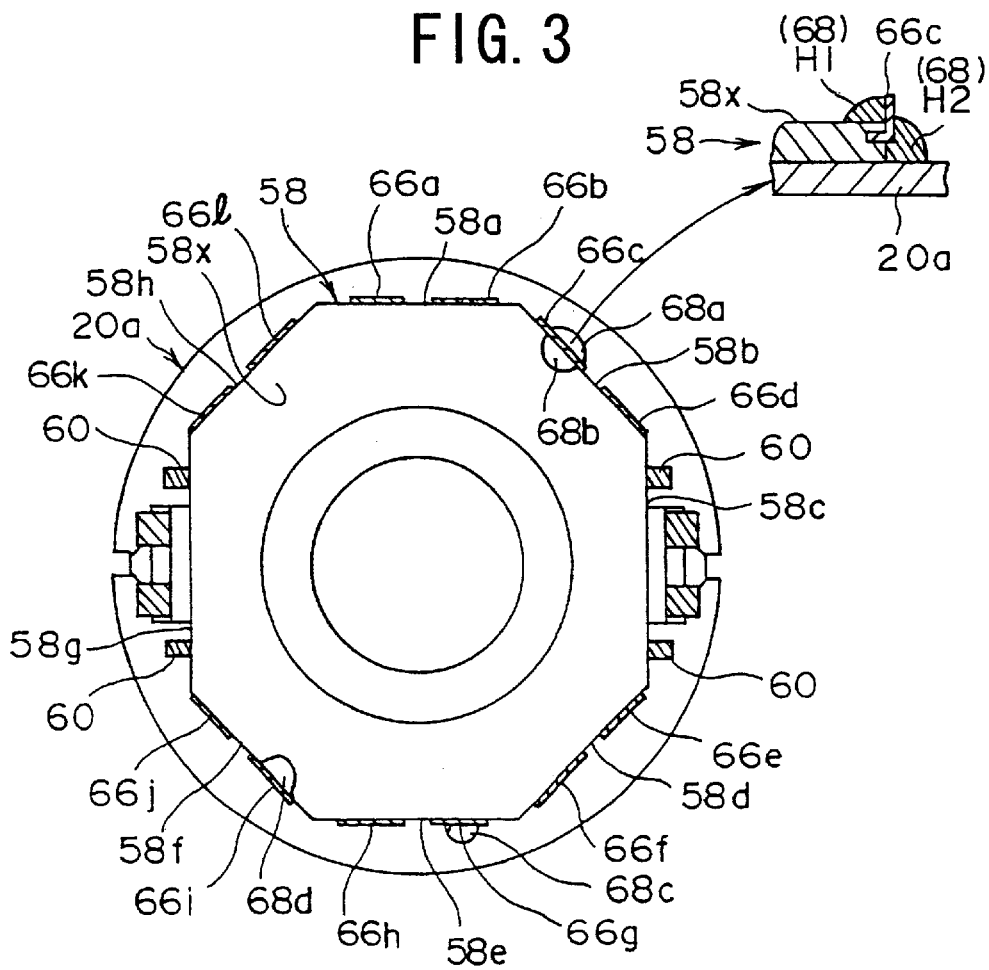
FIG. 3 is a plan view of a rotating rotary transducer and terminal, for the purpose of explaining a rotational balance adjustment mechanism for a rotary head drum device according to an embodiment of the present invention.

FIG. 3 is a plan view of a rotating rotary transducer and terminal, for the purpose of explaining a rotational balance adjustment mechanism for a rotary head drum device according to an embodiment of the present invention.

As shown in FIG. 3, the terminal 58 is formed so that a main surface 58x thereof has a regular octagonal shape. Accordingly, the periphery of the terminal 58 forms eight side surfaces, 58a through 58h. The electrodes 60 of the terminal 58 and the end 64 of the rotating rotary transducer 20 coil 62a occupy sides 58c and 58g. The remaining six sides 58a, 58b, 58d, 58e, 58f and 58h each mount two solder mounts 66a through 66l. The solder mounts 66a through 66l combine the functions of adjustable balance weights for rotational balance adjustment and of guards for preventing the solder from flying off the terminal 58. The solder mounts 66a through 66l are L-shaped metallic plates, one end of which is buried into the side surface of the terminal 58 (the terminal 58 being made of a resin substrate) and the other end of which projecting above the surface of the main surface 58x of the terminal 58.

Once an imbalance in the rotary head drum device 10 as a whole and the rotary transducer 20 is measured and calculated, such imbalance, if any, is corrected by applying solder in appropriate amounts at appropriate points, forming the balance weights 68a through 68d (in this case only four such balance weights are used for illustrative purposes only). At this time, in order to more securely prevent the balance weights 68a through 68d from flying off during high speed rotation the balance weights 68a through 68d are optimally formed on an inner side of the solder mounts 66a through 66l, shown in FIG. 3 as H1. If on the other hand ease of production is preferred, then the balance weights 68a through 68d are optimally formed on an outer side of the solder mounts 66a through 66l, shown in FIG. 3 as H2. Additionally, fine adjustment of the rotational balance can be made by shaving or bending the solder mounts 66a through 66l that function as balance weights. Similar fine adjustment of the rotational balance may be had by similarly treating the solder balance weights 68a through 68d.

Additionally, as described above the terminal 58 is made of a resin substrate, so low-cost resin may be used instead of solder to form balance weights thereon without undue difficulty.

The above description is provided in order to enable any person skilled in the art to make and use the invention and sets forth the best mode contemplated by the inventor of carrying out the invention.

The present invention is not limited to the specifically disclosed embodiments and variations, and modifications may be made without departing from the scope and spirit of the present invention.

The present application is based on Japanese Priority Application No. 11-192315, filed on Jul. 6, 1999, the entire contents of which are hereby incorporated by reference.

What is claimed is:

1. A rotational balance adjustment mechanism for a rotary head drum device comprising:
   a fixed drum;
   a shaft rotatably driven by a motor provided on the fixed drum;
   a rotary drum mounting a magnetic head, the rotary drum rotating atop the fixed drum; and
   a rotary transducer having a fixed transducer member provided on the fixed drum and a rotating transducer member provided on the rotary drum,
   wherein a plurality of solder balance weights is substantially directly mounted onto the rotary transducer having the rotating transducer member that is adapted to mount the solder balance weights for adjusting the rotational balance of the rotary drum,
   wherein each balance weight is mounted at an arbitrary position at a predetermined distance along an outer periphery of the rotating transducer member, and
   wherein mounting members are provided for mounting the balance weights to the rotating transducer, and said mounting members are configured to be shaved or bent for the purpose of achieving a fine adjustment of rotational balance.

2. The rotational balance adjustment mechanism for a rotary head drum device as claimed in claim 1, wherein the balance weight is variably shaped.

3. A rotational balance adjustment mechanism for a rotary head drum device comprising:
   a fixed drum;
   a shaft rotatably driven by a motor provided on the fixed drum;
   a rotary drum mounting a magnetic head, the rotary drum rotating atop the fixed drum;
   a rotary transducer having a fixed transducer member provided on the fixed drum and a rotating transducer member provided on the rotary drum; and a mounting member mounted on the rotating transducer member, wherein a plurality of solder balance weights is substantially directly mounted onto the rotary transducer having the mounting member that is adapted to mount the solder balance weights for adjusting the rotational balance of the rotary drum, wherein each balance weight is mounted at an arbitrary position at a predetermined distance along an outer periphery of the mounting member, and wherein mounting members are provided for mounting the balance weights to the rotating transducer, and said mounting members are configured to be shaved or bent for the purpose of achieving a fine adjustment of the rotational balance.

4. The rotational balance adjustment mechanism for a rotary head drum device as claimed in claim 3, wherein the balance weight is variably shaped.

5. The rotational balance adjustment mechanism for a rotary head drum device as claimed in claim 3, further comprising a guard member to prevent the balance weight from becoming unseated and flying off the rotational balance adjustment mechanism.

6. A rotational balance adjustment mechanism for a rotary head drum device comprising:

a fixed drum;

a shaft rotatably driven by a motor provided on the fixed drum;

a rotary drum mounting a magnetic head, the rotary drum rotating atop the fixed drum; and a rotary transducer having a fixed transducer member provided on the fixed drum and a rotating transducer member provided on the rotary drum, wherein the rotating transducer member is adapted to directly mount a plurality of solder balance weights for adjusting the rotational balance of the rotary drum, wherein the balance weights are mounted at positions spaced at a predetermined interval along an outer periphery of the rotating transducer member, and wherein mounting members are provided for mounting the balance weights to the rotating transducer, and said mounting members are configured to be shaved or bent for the purpose of achieving a fine adjustment of the rotational balance.

* * * * *